D. A. EAKEN.
LIQUID FILLING AND GAGING DEVICE.
APPLICATION FILED MAR. 22, 1916.
1,216,786.
Patented Feb. 20, 1917.
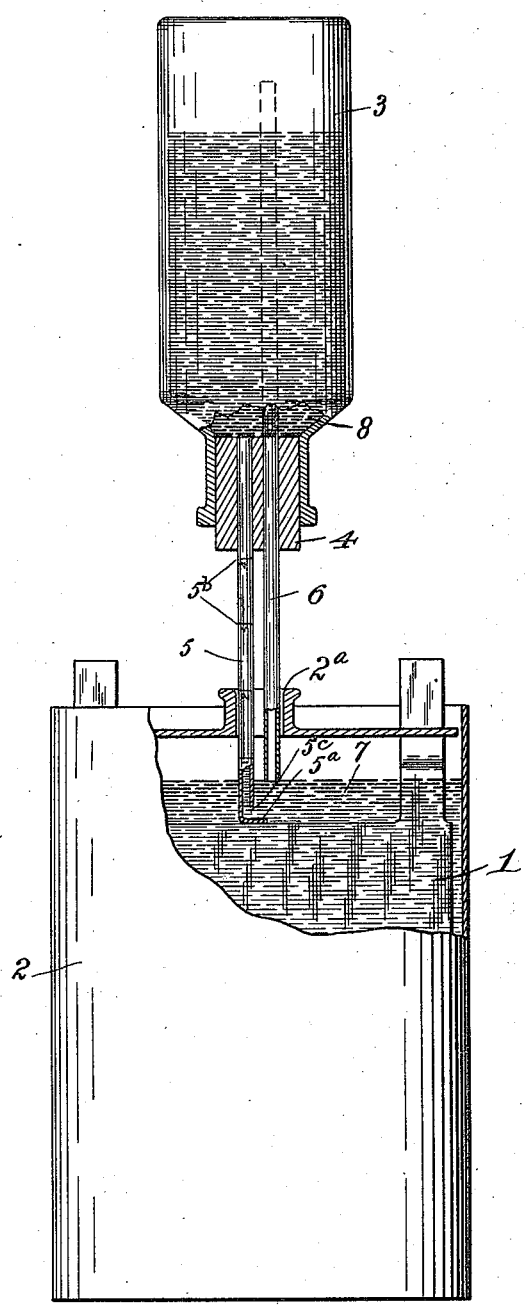
Inventor
Dwight A. Eaken
by
Chas E. Pillman Attorney

UNITED STATES PATENT OFFICE.

DWIGHT A. EAKEN, OF LODI, OHIO, ASSIGNOR OF ONE-HALF TO H. M. MYERS, OF LODI, OHIO.

LIQUID FILLING AND GAGING DEVICE.

1,216,786.   Specification of Letters Patent.   Patented Feb. 20, 1917.

Application filed March 22, 1916. Serial No. 85,808.

*To all whom it may concern:*

Be it known that I, DWIGHT A. EAKEN, a citizen of the United States, residing at Lodi, in the county of Medina and State of Ohio, have invented certain new and useful Improvements in Liquid Filling and Gaging Devices, of which the following is a specification.

My invention relates to improvements in liquid filling and gaging devices, the present embodiment of the invention being particularly designed and adapted for use in filling or replenishing the cells of liquid storage batteries with liquid, the improved device being adapted not only to conveniently insert the liquid but to automatically stop the flow of liquid into the cell when such liquid reaches any desired or predetermined height, as for example,—from one-half to three-fourths of an inch above the upper edges of the battery plates as now desired.

As is well known, it is necessary in all of these batteries to constantly replenish the same with distilled or rain water so that the plates within the cells may be kept submerged, preferably to a distance of one-half or three-fourths of an inch and the tops of these cells are generally provided with an opening normally closed by a stopper or plug (not shown) and through which the liquid is introduced, generally by means of a suitable syringe for this purpose, so that the depth of the liquid above the upper edges of the plates may be regulated.

While I have shown my invention for use in connection with the filling or replenishing of liquid storage batteries with liquid, it will of course be obvious that this invention may be adapted for use in the filling and gaging of various liquid receiving receptacles and for automatically supplying the same with liquid at a predetermined height.

The primary object of the invention is to provide a generally improved liquid filling and gaging device which will be exceedingly simple of construction, cheap of manufacture, and efficient in use.

In carrying out my invention I provide a liquid container with the fluid conduit pipes communicating with the opposite interior portions thereof, one of the pipes forming a liquid conduit pipe to convey the liquid into the receiving vessel and the other pipe being adjustable relative to the liquid conduit pipe and forming an air vent pipe or liquid gaging device, whereby to automatically cut off the flow of fluid through said pipe, or in other words, to automatically stop the flow of air into and liquid from said container when the liquid reaches the tip of the liquid gaging and air vent pipe, thereby enabling the user to readily replenish the cell or vessel with liquid at a certain predetermined height as governed by the distance between the tip of the fluid conduit or supporting pipe and the adjustable liquid gaging and air vent pipe.

With the above mentioned and other ends in view, the invention consists in the novel construction, arrangement, and combination of parts hereinafter described, illustrated in one of its embodiments in the accompanying drawings, and particularly pointed out in the appended claims.

The accompanying drawing is a side elevation, partly in section, of the improved liquid filling and gaging device in its operative position applied to the cell of an ordinary liquid storage battery and showing the manner in which the liquid in the portable container is automatically stopped or cut off when the liquid above the battery plates has reached a predetermined height. The improved device is adapted to be readily inserted through the opening 2ª of the battery cell in the act of replenishing the latter with liquid.

The present embodiment of the invention comprises a suitable hand or portable container or reservoir 3, said portable container or reservoir, in the present instance, comprising an ordinary bottle provided with a suitable closure 4, in the present instance, in the form of a cork or stopper 4, the latter being provided with openings to receive and contain a main or liquid conduit pipe 5, and an air vent or gage pipe 6, the latter being adjustably mounted so that the depth of the liquid 7, in the cell or receptacle to be filled may be regulated in accordance with the distance between the lower edge of the pipe 6, and the extreme lower edge of the foot 5ª of the liquid conduit pipe 5.

The liquid conduit pipe 5, may be provided with suitable graduations, or a scale 5ᵇ, if desired for convenient use in connection with the adjustably mounted air vent and gage pipe 6.

When the liquid 7, has been depleted by evaporation, or otherwise, beyond the desired quantity or depth, the filling and gaging device provided with a supply of liquid 8, is inserted through the opening 2ª allowing the foot 5ª on the conduit pipe 5, to rest on the plates 1, and the liquid 8, will drain out through the pipe 5, until it reaches the level of the lower edge of the air vent or gage pipe 6, in which instance the supply of air is automatically cut off from the interior of the reservoir or bottle 3, and the liquid ceases to flow out. The device is then removed and may be used to replenish successive battery cells. The foot 5ª, of the liquid supply pipe 5, is preferably merely a bent over or integral portion so as to allow a free outlet portion 5ᶜ, immediately above the plates 1, or above the bottom or other portion of any other vessel that may be receiving the liquid.

The combining air vent and gage pipe 6, may be readily adjusted in the closure or stopper 4, the free end of the gage pipe 6, indicating on the scale 5ᵇ, of the conduit pipe 5, the depth or predetermined height of liquid required for automatically shutting off the flow of liquid from the improved liquid filling and gaging device.

From the foregoing description, taken in connection with the accompanying drawings the advantages of my invention will be readily understood.

Having thus described one of the embodiments of my invention, without having attempted to set forth all the forms in which it may be made or all the modes of its use, what I claim and desire to secure by Letters Patent, is,—

1. A liquid filling and gaging device, comprising a portable container provided with fluid conduit and air vent pipes communicating with opposite interior portions thereof and projecting from one side thereof in close proximity and adapted to be inserted into the mouth of the receptacle to be filled, said fluid conduit pipe being provided with a graduated scale and being adapted to form a support and rest on a fixed portion within said receptacle and said air vent pipe being longitudinally adjustable relative to said conduit pipe and forming an adjustable gaging pipe automatically stopping the flow of air into and liquid from said container when the liquid discharged into the receptacle being filled reaches the tip of said air vent and liquid gaging pipe.

2. A liquid filling and gaging device, comprising a container provided with liquid conduit and air vent pipes projecting from one end in close parallel relation to each other for insertion in the opening of the vessel to be filled and communicating with the opposite interior portions of said container, said conduit pipe forming a support for said container to rest on a fixed member within said vessel to be filled and said air vent pipe being adjustable and having its tip spaced from the end of said conduit pipe forming an adjustable gage adapted to cut off the flow of liquid from said conduit pipe and into the receptacle to be filled when the discharged liquid reaches a depth corresponding to the projecting end of said air vent pipe.

In testimony whereof I have affixed my signature in the presence of two witnesses.

DWIGHT A. EAKEN.

Witnesses:
WALTER W. YOUNG,
F. H. WHITE.